(12) United States Patent
Lecoeuche

(10) Patent No.: US 10,539,476 B2
(45) Date of Patent: **\*Jan. 21, 2020**

(54) TEMPERATURE OR STRAIN DISTRIBUTION SENSOR COMPRISING A COHERENT RECEIVER TO DETERMINE A TEMPERATURE OR A STRAIN ASSOCIATED WITH A DEVICE UNDER TEST

(71) Applicant: VIAVI SOLUTIONS INC., San Jose, CA (US)

(72) Inventor: Vincent Lecoeuche, Tarentaise (FR)

(73) Assignee: VIAVI SOLUTIONS INC., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/968,330

(22) Filed: May 1, 2018

(65) Prior Publication Data

US 2018/0299346 A1 Oct. 18, 2018

Related U.S. Application Data

(63) Continuation of application No. 15/260,722, filed on Sep. 9, 2016, now Pat. No. 9,983,094.

(51) Int. Cl.
  *G01L 1/24* (2006.01)
  *G01K 11/32* (2006.01)

(52) U.S. Cl.
  CPC .............. *G01L 1/242* (2013.01); *G01K 11/32* (2013.01); *G01K 2011/322* (2013.01)

(58) Field of Classification Search
  CPC ............ G01K 11/32; G01K 2011/322; G01K 11/3127; G01L 1/242; G01M 11/3109;
  (Continued)

(56) References Cited

U.S. PATENT DOCUMENTS 5,751,413 A  5/1998 Chung et al.
6,380,534 B1  4/2002 Farhadiroushan et al.
(Continued)

FOREIGN PATENT DOCUMENTS

CN  103196584 B  3/2015
EP  3232165 A1  10/2017

OTHER PUBLICATIONS

Da-Peng Zhou et al., "Distributed Temperature and Strain Discrimination with Stimulated Brillouin Scattering and Rayleigh Backscatter in an Optical Fiber", Sensors, vol. 13, No. 2, Jan. 31, 2013, pp. 1836-1845.

(Continued)

Primary Examiner — Que Tan Le
(74) Attorney, Agent, or Firm — Mannava & Kang, P.C.

(57) ABSTRACT

According to examples, a temperature or strain distribution sensor may include a photodiode to acquire a beat frequency between a first laser beam and a second laser beam. A modulator may modulate the first laser beam that is to be injected into a device under test (DUT). A coherent receiver may acquire a backscattered signal from the DUT, and use the second laser beam as a local oscillator to determine a Brillouin trace with respect to the DUT. The Brillouin trace may be used to determine a Brillouin frequency shift and a Brillouin power for the DUT to implement an absolute referencing of a Rayleigh reference trace. The coherent receiver may determine, relative to the Rayleigh reference trace, a further Brillouin frequency shift and a Rayleigh frequency shift to determine a temperature or a strain associated with the DUT.

20 Claims, 5 Drawing Sheets

(58) Field of Classification Search
CPC .......... G01M 11/3172; G01M 11/3181; G01D 5/35358; G01D 5/35361; G01D 5/35364; G01D 5/35303
USPC .................................................... 250/227.14
See application file for complete search history.

(56) References Cited

U.S. PATENT DOCUMENTS

| | | | |
|---|---|---|---|
| 7,499,151 | B2 | 3/2009 | Bao et al. |
| 10,073,006 | B2* | 9/2018 | Lecoeuche .......... G01M 11/3127 |
| 2011/0090936 | A1 | 4/2011 | Kupershmidt |
| 2011/0228255 | A1 | 9/2011 | Li et al. |
| 2017/0010385 | A1* | 1/2017 | Englich .................... G01V 8/16 |

OTHER PUBLICATIONS

Kishida K et al., "An important milestone of distributed fiber optical sensing technology: Separate temperature and strain in single SM fiber", Optoelectronics and Communications Conference, Jul. 13, 2009, pp. 1-2.

Froggatt, Mark et al., "High-Spatial-Resolution Distributed Strain Measurement in Optical Fiber with Rayleigh Scatter", ResearchGate, article in Applied Optics, May 1998, 7 pages.

P.C.Wait and T.P.Newson, "Landau Placzek Ratio, Applied to Distributed Fibre Sensing", University of Southampton, United Kingdom, 1996, 17 pages.

Froggatt, Mark et al., "Distributed Strain and Temperature Discrimination in Unaltered Polarization Maintaining Fiber", Luna Technologies, Aug. 22, 2012, 4 pages.

Koyamada, Yahei et al., "Novel Fiber-Optic Distributed Strain and Temperature Sensor with Very High Resolution", IEICE Trans. Commun., vol. E89-B, No. 5 May 2006, 4 pages.

Parker, T.R., et al., "A Fully Distributed Simultaneous Strain and Temperature Sensor using Spontaneous Brillouin Backscatter", IEEE Photonics Technology Letters, vol. 9, No. 7, Jul. 1997, 3 pages.

Parker, T.R., et al., "Simultaneous Distributed Measurement of Strain and Temperature from Noise-Initiated Brillouin Scattering in Optical Fibers", IEEE Journal of Quantum Electronics, vol. 34, No. 4, Apr. 1998, 15 pages.

V. Lecoeuche, et al., "20-km Distributed Temperature Sensor Based on Spontaneous Brillouin Scattering", IEEE Photonics Technology Letters, vol. 12, No. 10, Oct. 2000, 3 pages.

* cited by examiner

200

```
┌─────────────────────────────────────────────────────────────┐
│ MAINTAIN A PREDETERMINED OFFSET FREQUENCY SHIFT BETWEEN A   │
│       FIRST LASER BEAM AND A SECOND LASER BEAM              │
│                           202                               │
└─────────────────────────────────────────────────────────────┘
                              ↓
┌─────────────────────────────────────────────────────────────┐
│              MODULATE THE FIRST LASER BEAM                  │
│                           204                               │
└─────────────────────────────────────────────────────────────┘
                              ↓
┌─────────────────────────────────────────────────────────────┐
│         ACQUIRE A BACKSCATTERED SIGNAL FROM THE DUT         │
│                           206                               │
└─────────────────────────────────────────────────────────────┘
                              ↓
┌─────────────────────────────────────────────────────────────┐
│ DETERMINE, BASED ON THE ACQUIRED BACKSCATTERED SIGNAL FROM  │
│         THE DUT, A BRILLOUIN TRACE FOR THE DUT              │
│                           208                               │
└─────────────────────────────────────────────────────────────┘
                              ↓
┌─────────────────────────────────────────────────────────────┐
│ DETERMINE, BASED ON THE BRILLOUIN TRACE, A BRILLOUIN        │
│ FREQUENCY SHIFT AND A BRILLOUIN POWER FOR THE DUT TO        │
│ IMPLEMENT AN ABSOLUTE REFERENCING OF A RAYLEIGH REFERENCE   │
│                         TRACE                               │
│                           210                               │
└─────────────────────────────────────────────────────────────┘
                              ↓
┌─────────────────────────────────────────────────────────────┐
│ DETERMINE, RELATIVE TO THE RAYLEIGH REFERENCE TRACE, A      │
│ FURTHER BRILLOUIN FREQUENCY SHIFT AND A RALEIGH             │
│                    FREQUENCY SHIFT                          │
│                           212                               │
└─────────────────────────────────────────────────────────────┘
                              ↓
┌─────────────────────────────────────────────────────────────┐
│ DETERMINE, BASED ON THE FURTHER BRILLOUIN FREQUENCY SHIFT   │
│ AND THE RALEIGH FREQUENCY SHIFT, A TEMPERATURE OR A STRAIN  │
│              ASSOCIATED WITH THE DUT                        │
│                           214                               │
└─────────────────────────────────────────────────────────────┘
```

```
┌─────────────────────────────────────────────────────────────┐
│ MAINTAIN A CONSTANT OPTICAL FREQUENCY FOR A FIRST LASER BEAM │
│               AND A SECOND LASER BEAM                        │
│                          302                                 │
└─────────────────────────────────────────────────────────────┘
                              ↓
┌─────────────────────────────────────────────────────────────┐
│              MODULATE THE FIRST LASER BEAM                   │
│                          304                                 │
└─────────────────────────────────────────────────────────────┘
                              ↓
┌─────────────────────────────────────────────────────────────┐
│          ACQUIRE A BACKSCATTERED SIGNAL FROM THE DUT         │
│                          306                                 │
└─────────────────────────────────────────────────────────────┘
                              ↓
┌─────────────────────────────────────────────────────────────┐
│ DETERMINE, BASED ON THE ACQUIRED BACKSCATTERED SIGNAL FROM   │
│             THE DUT, A RAYLEIGH TRACE FOR THE DUT            │
│                          308                                 │
└─────────────────────────────────────────────────────────────┘
                              ↓
┌─────────────────────────────────────────────────────────────┐
│ MAINTAIN A PREDETERMINED OFFSET FREQUENCY SHIFT BETWEEN THE  │
│         FIRST LASER BEAM AND THE SECOND LASER BEAM           │
│                          310                                 │
└─────────────────────────────────────────────────────────────┘
                              ↓
┌─────────────────────────────────────────────────────────────┐
│    MODULATE THE FIRST LASER BEAM THAT INCLUDES THE           │
│         PREDETERMINED OFFSET FREQUENCY SHIFT                 │
│                          312                                 │
└─────────────────────────────────────────────────────────────┘
                              ↓
┌─────────────────────────────────────────────────────────────┐
│      ACQUIRE A FURTHER BACKSCATTERED SIGNAL FROM THE DUT     │
│                          314                                 │
└─────────────────────────────────────────────────────────────┘
```

```
┌─────────────────────────────────────────────────────────────┐
│  DETERMINE, BASED ON THE ACQUIRED FURTHER BACKSCATTERED     │
│    SIGNAL FROM THE DUT, A BRILLOUIN TRACE FOR THE DUT       │
│                            316                              │
└─────────────────────────────────────────────────────────────┘
                              ▼
┌─────────────────────────────────────────────────────────────┐
│     DETERMINE, BASED ON THE BRILLOUIN TRACE, A BRILLOUIN    │
│    FREQUENCY SHIFT AND A BRILLOUIN POWER FOR THE DUT TO     │
│   IMPLEMENT AN ABSOLUTE REFERENCING OF A RAYLEIGH REFERENCE │
│                            TRACE                            │
│                            318                              │
└─────────────────────────────────────────────────────────────┘
                              ▼
┌─────────────────────────────────────────────────────────────┐
│   DETERMINE, RELATIVE TO THE RAYLEIGH REFERENCE TRACE, A    │
│     FURTHER BRILLOUIN FREQUENCY SHIFT AND A RALEIGH         │
│                      FREQUENCY SHIFT                        │
│                            320                              │
└─────────────────────────────────────────────────────────────┘
                              ▼
┌─────────────────────────────────────────────────────────────┐
│  DETERMINE, BASED ON THE FURTHER BRILLOUIN FREQUENCY SHIFT  │
│  AND THE RALEIGH FREQUENCY SHIFT, A TEMPERATURE OR A STRAIN │
│                   ASSOCIATED WITH THE DUT                   │
│                            322                              │
└─────────────────────────────────────────────────────────────┘
```

FIG. 3
(CONT)

TEMPERATURE OR STRAIN DISTRIBUTION SENSOR COMPRISING A COHERENT RECEIVER TO DETERMINE A TEMPERATURE OR A STRAIN ASSOCIATED WITH A DEVICE UNDER TEST

PRIORITY

This application is a Continuation of commonly assigned and co-pending U.S. patent application Ser. No. 15/260,722, filed Sept. 9, 2016, the disclosure of which is hereby incorporated by reference in its entirety.

BACKGROUND

In optical fibers, loss mechanisms of light transmission may include light absorption and scattering. With respect to absorption, light may be absorbed in optical fiber material as the energy of the light is converted to heat. With respect to scattering, light energy may be dispersed in a variety of directions as the light travels through an optical fiber, with some of the light energy being returned down the core of the optical fiber. In this regard, Brillouin scattering occurs when light passing through a transparent medium interacts with periodic spatial and temporal variations of the refractive index created by acoustic waves. Brillouin scattering, which is dependent on environmental variables such as strain and temperature, may be used to sense mechanical strain and/or temperature in optical fibers. Compared to Brillouin scattering, Rayleigh scattering pertains to the elastic scattering of light or other electromagnetic radiation by particles. Rayleigh scattering may be used to identify anomalies in transmission of a signal along an optical fiber.

BRIEF DESCRIPTION OF DRAWINGS

Features of the present disclosure are illustrated by way of examples shown in the following figures. In the following figures, like numerals indicate like elements, in which:

FIG. 2 illustrates a flowchart of a method for temperature or strain determination, according to an example of the present disclosure;

FIG. 3 illustrates another flowchart of a method for temperature or strain determination, according to an example of the present disclosure.

DETAILED DESCRIPTION

Figure 1:
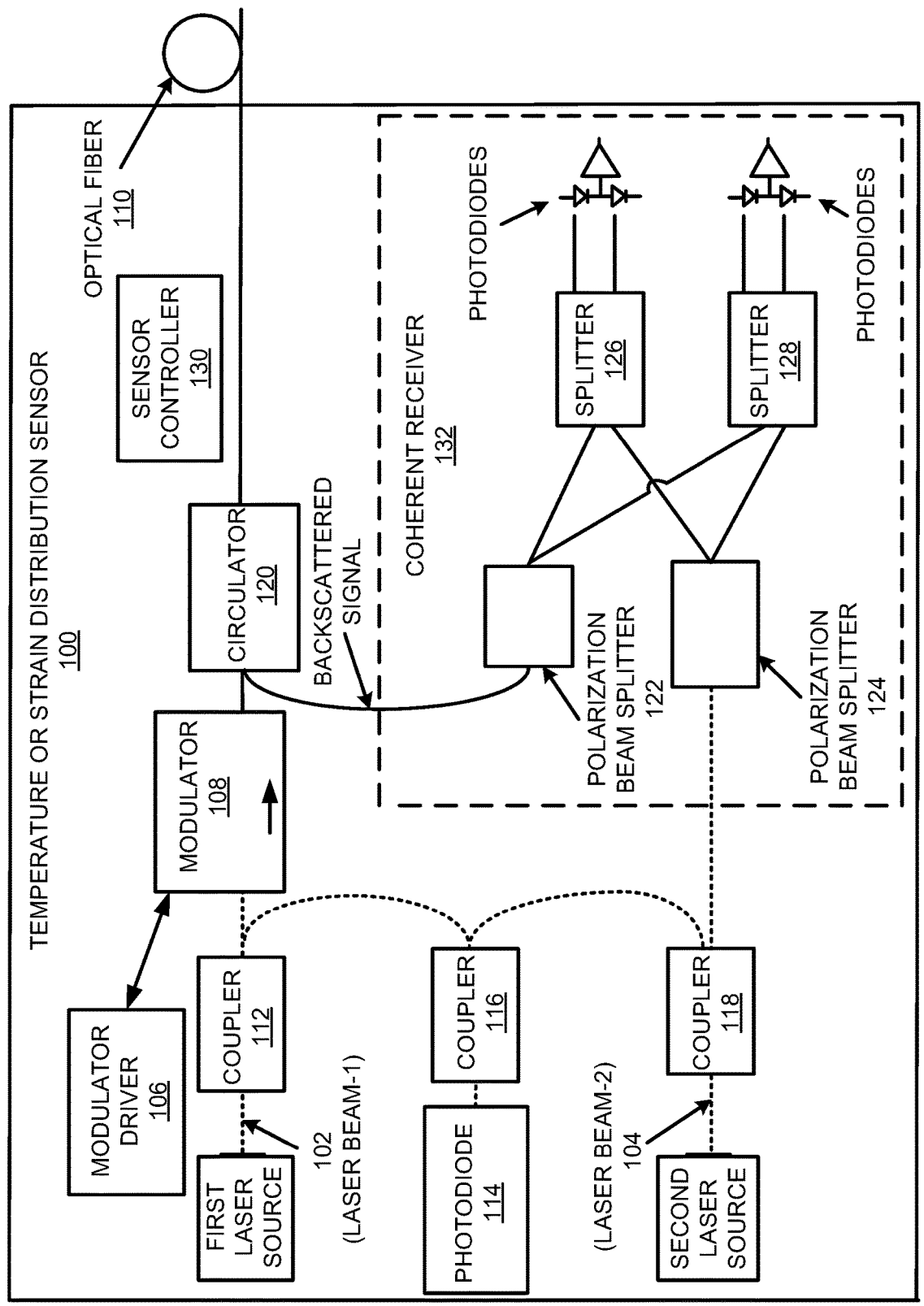
FIG. 1 illustrates an architecture of a temperature or strain distribution sensor, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a temperature or strain distribution sensor may include a pair of tunable laser sources and a semiconductor optical amplifier (SOA). By tuning the laser sources to include a predetermined offset frequency shift, the sensor may be used to determine both Brillouin and Rayleigh traces for an optical fiber. In an initial acquisition, Brillouin frequency shift and Brillouin power may be used to implement an absolute referencing of a Rayleigh reference trace (or traces). The Rayleigh reference trace may represent a reference point for subsequent measurements of the Rayleigh frequency shift. In this regard, the absolute referencing of the Rayleigh reference trace (or traces) may then be used to determine temperature and/or strain of an optical fiber by using the Brillouin frequency shift and the Rayleigh frequency shift in subsequent acquisitions. Thus, with respect to acquisition, the temperature or strain distribution sensor provides for the acquisition of a Brillouin spectrum, a Rayleigh "loss" trace, and Rayleigh "coherent noise" traces. With respect to the Brillouin spectrum, the temperature or strain distribution sensor provides for the acquisition of the Brillouin spectrum with essentially constant optical frequency and a frequency shift between two lasers of approximately 10.8 GHz (10-13 GHz). With respect to the Rayleigh "loss" trace, the temperature or strain distribution sensor provides for the acquisition of the Rayleigh "loss" trace (e.g., for a Landau Placzek ratio) with two lasers being scanned, potentially over the entire C-Band and with a constant frequency shift between two lasers (e.g., 240 MHz). Further, with respect to the Rayleigh "coherent noise" traces, the temperature or strain distribution sensor provides for the acquisition of the Rayleigh "coherent noise" traces, for Rayleigh shift measurement, at various optical frequencies (fixed during each acquisition) and a constant frequency shift between two lasers (e.g., 240 MHz).

An optical amplifier (OA) may amplify an optical signal directly, without the need to first convert the optical signal to an electrical signal. An SOA is a type of OA based on a semiconductor gain medium. The SOA may provide for high optical gain with respect to an optical signal over a wide wavelength range.

For the temperature or strain distribution sensor disclosed herein, with respect to the Rayleigh reference trace, a plurality of Rayleigh reference traces may be stored and used at different optical frequencies to confirm and/or more accurately determine correlations between the Rayleigh reference traces and acquisitions of the Rayleigh frequency shift.

For the temperature or strain distribution sensor disclosed herein, the absolute referencing may be applied to a Rayleigh frequency shift measurement that is acquired with an optical frequency domain reflectometer (OFDR). In this regard, the temperature or strain distribution sensor disclosed herein may be used to acquire an OFDR measurement.

An optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

The OFDR provides information on local characteristic when the backscatter signal detected during a measurement time is measured as a function of frequency, and then subjected to Fourier transformation. Compared to OTDR, the OFDR achieves a relatively higher spatial resolution.

The temperature or strain distribution sensor disclosed herein may address challenges related to the non-absolute nature of Rayleigh measurements. In this regard, the temperature or strain distribution sensor disclosed herein may eliminate the need to estimate conditions of the reference acquisition. The temperature or strain distribution sensor disclosed herein may eliminate the need to reference in a controlled environment (e.g., a lab). The temperature or strain distribution sensor disclosed herein may eliminate the need to have a specified instrumentation choice before fiber installation. Further, the temperature or strain distribution sensor disclosed herein may eliminate the need to maintain reference data. Thus, if reference data is lost, and/or the reference data is no longer compatible with newer or different equipment, the temperature or strain distribution sensor disclosed herein may be used, without such previously determined reference data, to determine temperature and/or strain of an optical fiber.

According to examples of the present disclosure, as disclosed herein, the temperature or strain distribution sensor may provide for both Brillouin and Rayleigh trace determination with respect to an optical fiber. The Brillouin trace may be used to determine the Brillouin frequency shift, the Brillouin power, and an absolute referential to the Rayleigh reference trace, and the Rayleigh trace may be used to determine the relative Rayleigh frequency shift.

With respect to Brillouin trace determination, a controlled frequency shift between two laser beams may be maintained for the temperature or strain distribution sensor. According to an example, the range of the offset frequency shift for the Brillouin trace determination may include frequencies between approximately 10.0 GHz to approximately 13 GHz. For example, the two laser beams may be set with an approximately 10.8 GHz offset frequency shift. A first laser beam of the two laser beams may be modulated with an external modulator. The modulated laser beam may be injected into a Device Under Test (DUT). For example, the DUT may include an optical fiber. A backscattered signal from the DUT may be acquired by a coherent receiver. At the coherent receiver, the backscattered signal may be mixed with a second laser beam that is used as a local oscillator. With respect to use of the second laser beam as a local oscillator, the relatively low amplitude backscattered signal associated with the first laser beam may be mixed with a relatively high amplitude signal of the second laser beam at the coherent receiver. The coherent receiver may be a polarization diversity coherent receiver. A sensor controller may be communicatively connected to each of the components of the temperature or strain distribution sensor to control operations of the components. The sensor controller may perform various functions as disclosed herein with respect to Brillouin trace determination. For example, the sensor controller may repeat the acquisitions for various frequency shifts between the two laser beams in order to sample the distributed Brillouin spectra. Brillouin interaction in the DUT shifts the backscattered signal in frequency with respect to the original probe pulse. The frequency shift value is a quantity close to plus or minus 10.8 GHz, for an anti-Stokes or Stokes interaction respectively. Stokes shift may be described as the negative frequency shift observable when an optical wave is backscattered by a co-propagating acoustic wave, a phenomenon generally assimilated to a Doppler effect. A positive—namely anti-Stokes—frequency shift occurs when an optical wave is backscattered by a counter-propagating acoustic wave. By setting and tuning the frequency shift between the two laser sources, a coherent detection around zero frequencies, allows the recording of the distributed Brillouin spectra. The resonant Brillouin frequency shift along the DUT may be determined from analysis of the Brillouin trace, for example, by fitting of the Brillouin spectra. Further, the integrated Brillouin power may be determined, for example, by performing an integration operation with respect to the resonant Brillouin frequency shift. The Brillouin frequency shift and the integrated Brillouin power may be used to sense mechanical strain and/or temperature in the DUT.

With respect to Rayleigh trace determination, the temperature or strain distribution sensor may scan the two laser beams over a wavelength range with a maintained frequency shift between the two laser beams. For example, the two laser beams may be set with an offset frequency shift. According to an example, the range of the offset frequency shift for the Rayleigh trace determination may include frequencies between approximately 100.0 KHz to approximately 1 GHz. For example, the offset frequency shift may be set at approximately 240 MHz. According to an example, the wavelength range may include a range of 10's of GHz (e.g., 15 GHz) to several THz (e.g., 5 THz). The first laser beam may be modulated with an external modulator. The modulated laser beam may be injected into the DUT. For example, the DUT may include an optical fiber. A backscattered signal from the DUT may be acquired by the coherent receiver. The backscattered signal may be mixed with the second laser beam that is used as a local oscillator. The sensor controller may perform various functions as disclosed herein with respect to Rayleigh trace determination. For example, the sensor controller may perform averaging of repeated acquisitions while scanning the two laser beams in order to reduce coherent fading noises. The coherent detection at the predetermined offset frequency shift yields the Rayleigh trace. The Rayleigh trace may be used to identify anomalies in transmission of a signal along the DUT, and to normalize the Brillouin power.

With respect to Rayleigh frequency shift determination, the temperature or strain distribution sensor may use the two laser beams to apply a single optical frequency.

With respect to temperature and/or strain determination, as disclosed herein, the Rayleigh reference trace (or traces) may be used to determine temperature and/or strain associated with an optical fiber by using the Brillouin frequency shift and the Rayleigh frequency shift in subsequent acquisitions. For an optical fiber, if the optical fiber is stretched, scattering elements that are scanned are disposed further apart based on the stretching. Thus, stretching of an optical fiber has a scaling effect on the properties of the optical fiber. The stretching of the optical fiber also changes the phase of a signal that is scattered. This change of the phase of the signal changes the interference pattern associated with the optical fiber, which thus changes the shape of the coherent noise and the Rayleigh trace. For example, if a wavelength compared to an initial state is changed by a factor of 1.05, then the wavelength is scaled based on scaling of the scattering elements. If the scattering elements are spread by 5%, and the wavelength is increased by 5%, then the phase relationship may be recovered. Thus, by taking a Rayleigh reference trace at a given state of the optical fiber, if the state of optical fiber changes because of temperature and strain, the temperature and/or strain associated with the optical fiber may be determined by determining the wavelength associated with the Rayleigh reference trace.

FIG. 1 illustrates an architecture of a temperature or strain distribution sensor 100 (hereinafter referred to as "sensor 100"), according to an example of the present disclosure. Referring to FIG. 1, the sensor 100 may include a first laser source that emits a first laser beam at 102 and a second laser source that emits a second laser beam at 104. The first laser beam and the second laser beam may be respectively designated as Laser Beam-1 and Laser Beam-2. Each of the laser sources may be a distributed feedback (DFB) laser source. A DFB laser source may be described as an optical fiber laser source where the active region of the laser source is periodically structured as a diffraction grating.

A modulator driver 106 may drive a modulator 108. The modulator 108 may modulate the Laser Beam-1. The modulator 108 may be an external modulator. Examples of the modulator 108 include an SOA, an Acousto Optic Modulator (AOM), or an Electro Optic Modulator (EOM). The modulator 108 may modulate the Laser Beam-1, for example, between a range of 10 ns to 1 μs. The modulator 108 may be intermediately disposed between the Laser Beam-1 and an optical fiber 110. The modulator 108 may provide for amplification of the optical signal from a coupler 112. That is, the modulator 108 may provide high optical gain with respect to the optical signal from the coupler 112 over a wide wavelength range.

A photodiode 114 may be connectively disposed between the Laser Beam-1 and the Laser Beam-2. The photodiode 114 may measure the frequency of the beat between the Laser Beam-1 and the Laser Beam-2. The frequency of the beat between the Laser Beam-1 and the Laser Beam-2 may be used, for example, to set a predetermined offset frequency shift between the Laser Beam-1 and the Laser Beam-2. With respect to the predetermined offset frequency shift, the photodiode 114 may provide a signal proportional to the intensity of an optical field. The optical field may be composed of two monochromatic optical signals in the same linearly polarized state, with a frequency difference between the Laser Beam-1 and the Laser Beam-2 within the response bandwidth of the photodiode 114. The two field interferences may produce a beat frequency at this frequency, which is observable in the output signal of the photodiode 114.

Couplers 112, 116, and 118 may be connected to the Laser Beam-1, photodiode 114, and the Laser Beam-2. The couplers 112, 116, and 118 may include 1×2 couplers as shown in FIG. 1. For example, the coupler 112 provides fiber optic coupling for the transmission to the modulator 108 and the coupler 116. The coupler 112 may be designated as a 90/10 coupler, where 90% of the laser beam is directed to the modulator 108, and 10% of the laser beam is directed to the photodiode 114. Coupler 116 may be designated as a 50/50 coupler, and coupler 118 may be designated as a 90/10 coupler.

A circulator 120 may be intermediately disposed between the modulator 108 and the optical fiber 110. The circulator 120 may receive the amplified laser beam from the modulator 108, and direct the amplified laser beam to the optical fiber 110. Further, the circulator 120 may receive the backscattered signal from the optical fiber 110.

A polarization beam splitter (PBS) 122 may be used to receive the backscattered signal from the optical fiber 110 via the circulator 120. The PBS 122 may separate the backscatter signal into two different polarization beams. That is, because the backscattered light from the optical fiber 110 is at an unknown polarization state, the PBS 122 may divide the backscattered light into two polarization states. The polarization states may represent projections over two polar states. The two polar sates may represent S-polarized light and P-polarized light. The S-polarization refers to light that is polarized perpendicularly to the plane of incidence. The P-polarization refers to light that is polarized parallel to the plane of incidence.

A PBS 124 may be used to receive the Laser Beam-2. The PBS 124 may separate the Laser Beam-2 into two different polarization beams.

Output from the PBS 122 may be separated between splitters 126 and 128. At splitter 126, S-polarized light may be mixed with the S-polarized Laser Beam-2. At splitter 128, P-polarized light may be mixed with the P-polarized Laser Beam-2.

The outputs from the splitters 126 and 128 may be directed to photodiodes. The splitters 126 and 128 may include 2×2 splitters. The splitters 126 and 128 may be 50/50 splitters where 50% of the backscattered signal and 50% of the laser beam at the correct polarization is directed to the corresponding photodiodes.

A sensor controller 130 may operate in conjunction with a coherent receiver 132 to determine the Brillouin trace and the Rayleigh trace as disclosed herein. The coherent receiver 132 may include the PBS 122, the PBS 124, the splitters 126 and 128, and the photodiodes.

The Rayleigh trace or the Brillouin trace may represent the temporal evolution of optical power at the corresponding optical frequency or range of frequencies, acquired synchronously after each pulse. The electrical signals generated by the photodiodes of the coherent receiver 132 may reflect beat frequencies of the backscattered fields with the local oscillator. The bandwidth of the photodiodes of the coherent receiver 132, electrical amplification, and analogue to digital conversion may set some frequency limits to the optical signals that may be acquired. The accessible optical frequency range is then comprised between the frequency of the optical oscillation plus or minus a global electrical bandwidth. The electrical signals generated by the photodiodes of the coherent receiver 132 may be processed to further reduce the range of accessible frequencies, for example, by analogue or digital filters, which may be low-pass and band-pass filters. The electrical signals generated by the photodiodes of the coherent receiver 132 are proportional to the field of the optical backscattered signal, and may be processed by analogue or digital techniques in order to determine a power. For example a digital squaring and averaging procedure may yield the effective power.

With respect to the Brillouin trace, the Laser Beam-1 and the Laser Beam-2 may be set to an offset frequency shift within a range of approximately 10.0 GHz-13.0 GHz. For example, the Laser Beam-1 and the Laser Beam-2 may be set to approximately 10.8 GHz offset frequency shift. With such a value of the frequency shift, a coherent detection at low frequencies (e.g., around zero frequency) may yield the Brillouin trace. In this regard, a low-pass filter may be used with respect to the Brillouin trace determination.

With respect to the Rayleigh trace, the Laser Beam-1 and the Laser Beam-2 may be set with an offset frequency shift. The coherent detection at this same frequency yields the Rayleigh trace. For example, with respect to the Rayleigh trace, the Laser Beam-1 and the Laser Beam-2 may be set to an offset frequency shift within a range of approximately 100.0 KHz to approximately 1.0 GHz. The limitation of greater than approximately 100.0 KHz may be set based on a choice of a dual-laser-beat-frequency-meter scheme, and another mean may be needed to maintain two lasers with zero or a close-to-zero frequency difference. According to an example, with respect to the Rayleigh trace, the Laser Beam-1 and the Laser Beam-2 may be set to an offset frequency shift of approximately 240 MHz. In this regard, a band-pass filter may be used with respect to the Rayleigh trace determination.

Operation of the sensor 100 for Brillouin frequency shift and Brillouin power determination is described with reference to FIG. 1.

With respect to Brillouin frequency shift and Brillouin power, the sensor 100 may maintain a predetermined offset frequency shift between the Laser Beam-1 and the Laser Beam-2. For example, the Laser Beam-1 and the Laser Beam-2 may be set to approximately 10.8 GHz offset frequency shift. For example, the Laser Beam-1 may be set to a predetermined frequency of 193 THz and an offset frequency shift of 10.8 GHz, and the Laser Beam-2 may be set to the predetermined frequency of approximately 193 THz. When the Laser Beam-1 and the Laser Beam-2 are shifted at a high frequency of approximately 10.8 GHz, the backscattered light returning from the optical fiber 110 is approximately at a frequency of the Laser Beam-2, which provides for Brillouin detection.

The Laser Beam-1 may be modulated with the modulator 108.

The modulated Laser Beam-1 may be injected into the DUT. For the example of FIG. 1, the DUT may include the optical fiber 110.

The backscattered signal from the optical fiber 110 may be acquired with the coherent receiver 132. At the coherent receiver 132, the Laser Beam-2 may be used as a local oscillator.

The acquisitions of the backscattered signal may be repeated for various frequency shifts between the two laser beams in order to sample the distributed Brillouin spectra. For example, assuming that a Brillouin trace is determined at approximately 10.8 GHz, the acquisitions may be acquired for various frequency shifts in the range of approximately 10.7 GHz to 10.9 GHz in increments of 1.0-10.0 MHz.

A coherent detection at low frequencies (e.g., around zero frequency), with laser beam frequency shift set at 10.8 GHz yields the Brillouin trace.

The resonant Brillouin frequency shift along the optical fiber 110 may be determined from the distributed Brillouin spectra. The resonant Brillouin frequency shift along the optical fiber 110 may be determined by fitting the distributed Brillouin spectra. Further, the integrated Brillouin power may be determined from the distributed Brillouin spectra. For example, the integrated Brillouin power may be determined from the distributed Brillouin spectra by applying an integration operation to the distributed Brillouin spectra. The resonant Brillouin frequency shift along the optical fiber 110 and the integrated Brillouin power may be used to determine the mechanical strain and/or temperature along the optical fiber 110.

Operation of the sensor 100 for Rayleigh trace determination is described with reference to FIG. 1.

With respect to the Rayleigh trace determination, for the sensor 100, the Laser Beam-1 and the Laser Beam-2 may be scanned over a wavelength range with a maintained frequency shift between the two laser beams. With respect to the Rayleigh trace determination, the offset frequency shift may include frequencies within a range of approximately 100.0 KHz to approximately 1 GHz. For example, the Laser Beam-1 and the Laser Beam-2 may be set to a predetermined frequency of approximately 193 THz, with a 240 MHz offset frequency shift specified for the Laser Beam-1. Thus, at low frequency shifts, the Rayleigh trace may be determined. The scanning of the Laser Beam-1 and the Laser Beam-2 over a wavelength range with a maintained frequency shift between the two laser beams may be used to continuously tune the laser sources for the Laser Beam-1 and the Laser Beam-2.

The Laser Beam-1 may be modulated with the modulator 108.

The modulated Laser Beam-1 may be injected into the DUT. For the example of FIG. 1, the DUT may include the optical fiber 110.

The backscattered signal from the optical fiber 110 may be acquired with the coherent receiver 132. At the coherent receiver 132, the Laser Beam-2 may be used as a local oscillator.

The acquisitions of the backscattered signal may be repeated at the same predetermined offset frequency shift. For the Rayleigh traces the repeated acquisitions may be averaged while scanning the two laser beams in order to reduce coherent fading noises. Thus the coherent detection at the offset frequency shift yields the Rayleigh trace, where the range of possible frequencies includes approximately 100.0 KHz to approximately 1 GHz. The Rayleigh trace may represent the Rayleigh power as function of time or distance along the optical fiber 110.

Alternatively or additionally, with respect to the Rayleigh trace determination, the sensor 100 may be operated at a constant wavelength during the Rayleigh trace acquisition. That is, the optical frequency of the Laser Beam-1 and the Laser Beam-2 may be maintained at a same value. Maintaining the optical frequency of the Laser Beam-1 and the Laser Beam-2 at the same value sets the frequency of the coherent receiver 132, and thus, the power returning from the optical fiber 110 may be measured.

The modulator 108 may be pulsed in order to have distributed information over the optical fiber 110. Thus, the Laser Beam-1 may be modulated with the modulator 108.

The modulated Laser Beam-1 may be injected into the DUT. For the example of FIG. 1, the DUT may include the optical fiber 110.

The backscattered signal from the optical fiber 110 may be acquired with the coherent receiver 132. At the coherent receiver 132, the Laser Beam-2 may be used as a local oscillator.

The acquisitions of the backscattered signal may be repeated at the same wavelength. Thus the coherent detection at the same wavelength yields the Rayleigh trace. The Rayleigh trace may represent the Rayleigh power as function of time or distance along the optical fiber 110.

The measurement of the Brillouin frequency shift may be performed with acceptable accuracy under relatively low signal to noise ratio conditions, as obtained for example with one meter spatial resolution. In this regard, a Landau Placzek ratio may be described as a ratio of intensities of Rayleigh and Brillouin backscattered light in an optical fiber (i.e., Brillouin power divided by clean Rayleigh power). It may be challenging to acquire the Landau-Placzek ratio at approximately one meter spatial resolution. With respect to Rayleigh information, the spatial resolution may be on the order of cm. For example, an error of 0.33% either on Brillouin and Rayleigh power may correspond to an approximately 1° C. error with respect to temperature determination. In this regard, the sensor 100 may provide absolute accuracy based on the use of absolute information and high spatial resolution, for example, in the range of less than one meter. That is, although the Rayleigh frequency shift may be measured on the order of cm resolution, since the Rayleigh frequency shift is relative, the Brillouin frequency shift and the Landau-Placzek ratio may be used to provide the absolute referencing.

Operation of the sensor 100 for temperature and/or strain determination is described with reference to FIG. 1.

With respect to temperature and/or strain determination, as disclosed herein, the Brillouin frequency shift may be combined with the Rayleigh frequency shift. With respect to combining of the Brillouin frequency shift with the Rayleigh frequency shift, as disclosed herein, for each optical fiber section, the optical frequency shift may yield the best correlation with the reference signal at the same position. In a similar manner as the Brillouin frequency shift and the Landau-Placzek ratio yield temperature and strain, Brillouin frequency shift and Rayleigh frequency shift include different and monotonic dependencies on strain and temperature which allows the determination of strain and temperature (i.e., two equations and two unknowns). Since the Rayleigh frequency shift is relative to a reference acquisition taken by the sensor 100, if the reference signal (i.e., the reference information) is not available, the sensor 100 may be used to calibrate the Rayleigh frequency shift by determining a new Rayleigh reference trace that is absolutely known. Thus, the calibration of the Rayleigh frequency shift may eliminate the need to determine Rayleigh trace information for the optical fiber 110, for example, under known and controlled conditions of strain and temperature. That is, absent the calibration of the Rayleigh frequency shift by the sensor 100, any temperature and/or strain determination based on the combination of the Brillouin frequency shift with the Rayleigh frequency shift would be relative to an unknown test condition of the optical fiber 110. For example, after installation, the optical fiber 110 may already be under stress and include thermal gradients, or the optical fiber 110 may be pre-stressed in order to record shrinkage as well as elongation. Moreover, a reference trace may also become lost. In such events, for example, the sensor 100 may provide for calibration by determination of the Rayleigh reference trace in an absolute manner so that any temperature and/or strain determination based on use of the Brillouin frequency shift and the Rayleigh frequency shift in subsequent acquisitions are based on a known Rayleigh reference trace.

The first measurement with respect to the Rayleigh reference trace may be performed at a specified wavelength that will serve as a reference for subsequent measurements of the Brillouin frequency shift and the Rayleigh frequency shift. For the first measurement at the specified wavelength, the value of the wavelength may be used as a reference point for the subsequent measurements of the Brillouin frequency shift and the Rayleigh frequency shift. The Rayleigh reference trace determined at the specified wavelength may represent an absolute reference that is based on absolute values.

With respect to determination of the Rayleigh reference trace (or traces), the Brillouin power and Brillouin frequency shift may be combined to provide the absolute Rayleigh reference trace (or traces). For the reference traces, Brillouin power and Brillouin frequency shift provides absolute temperature and strain through two equations two unknowns. From this point, all subsequently recorded variations of Brillouin frequency shift and Rayleigh frequency shift allow calculations of a variation of temperature and strain with respect to a known state, and are therefore absolute. Minimal content of reference includes temperature (T), strain, Brillouin frequency shift, and at least one coherent Rayleigh trace as a function of distance.

With respect to the Rayleigh reference trace, the Rayleigh reference trace may be acquired by determining the Rayleigh trace of the optical fiber 110 at a constant optical frequency to recover the signature of the optical fiber 110. The optical frequency may be scanned with a step and range that is specified to increase precision of the Rayleigh reference trace determination. For example, a relatively large range provides for the coverage of a similarly large range of temperature and strain in the optical fiber 110. Similarly, a relatively small range provides for the coverage of a similarly small range (and higher resolution) of temperature and strain in the optical fiber 110.

With respect to the Rayleigh frequency shift, the sensor 100 may shift the frequency of optical light to recover the signature of optical fiber 110. The signature of optical fiber 110 may be recovered at high spatial resolution. Although the Rayleigh frequency shift may be referenced by an absolute Rayleigh reference trace, the information that is used for the referencing may not include the same spatial resolution. For example, an absolute measurement may include a one meter spatial resolution, and the Rayleigh reference trace may include a sub-meter (e.g., 10 cm) spatial resolution. Thus, the acquisition of the Rayleigh reference trace may be based on the assumption that at the time of the acquisition, the optical fiber 110 does not include temperature and strain events that are shorter than the spatial resolution of the absolute measurement. That is, at the time of the Rayleigh reference trace determination, the acquisition of the Rayleigh reference trace may be based on the assumption that there are no events faster than the spatial resolution used for the Brillouin power signal. Subsequent measurements of temperature and/or strain for the lifetime of the optical fiber 110 may be performed using the Brillouin frequency shift and the Rayleigh frequency shift, which both allow a higher spatial resolution.

Further to the determination of the Rayleigh reference trace, subsequent acquisitions of the Brillouin frequency shift and the Rayleigh frequency shift may be performed at various wavelengths. For example, over a lifetime of the optical fiber 110, the optical wavelength of the optical fiber 110 may be scanned to determine a signature of the optical fiber 110. Each of the scans may be performed over a specified range determined by how the temperature and strain may have changed. Thus, measurements for the Rayleigh reference trace may be performed at different optical frequencies until a signal that best matches the Rayleigh reference trace is identified. Each part of the optical fiber 110 may include a different signature. However, the signature is constant for different parts of the optical fiber 110. Further, the temperature along the optical fiber 110 may change differently at different parts of the optical fiber 110, and the signature associated with the optical fiber 110 may be identified at different optical frequencies depending on the point along the optical fiber 110 that is being considered.

The sensor 100 may further be used to determine the wavelength shift that is needed to obtain a maximal correlation between the Rayleigh reference trace and the current acquisition of the Brillouin frequency shift and the Rayleigh frequency shift. This wavelength shift may be determined for each segment of the acquisition, yielding relative information on strain or temperature. In this regard, a portion of the signal for a segment of optical fiber 110 may be compared to reference data, for example, by performing a correlation. A determination of the correlation of the reference signal may be performed with different segments of traces that are acquired at different optical frequencies.

In order to determine the temperature and/or strain at a specified point of the optical fiber 110, the Brillouin frequency shift and the Rayleigh frequency shift may be combined to yield the absolute temperature and/or strain. Thus, since the relative measurements are performed compared to a reference signal which is absolute, the temperature and strain at a specified point of the optical fiber 110 are absolute measurements of temperature and strain.

FIGS. 2 and 3 respectively illustrate flowcharts of methods 200 and 300 for temperature or strain determination, according to examples. The methods 200 and 300 may be implemented on the temperature or strain distribution sensor described above with reference to FIG. 1 by way of example and not limitation. The methods 200 and 300 may be practiced in other systems.

Referring to FIGS. 1-2, and particularly FIG. 2, at block 202, the method 200 may include maintaining a predetermined offset frequency shift between a first laser beam and a second laser beam. The predetermined offset frequency shift may be relative to a predetermined frequency of either the first laser beam or the second laser beam.

At block 204, the method 200 may include modulating the first laser beam. The modulated first laser beam may be injected into a DUT.

At block 206, the method 200 may include acquiring a backscattered signal from the DUT. The backscattered signal results from the modulated first laser beam injected into the DUT, and the second laser beam may be used as a local oscillator.

At block 208, the method 200 may include determining, based on the acquired backscattered signal from the DUT, a Brillouin trace for the DUT.

At block 210, the method 200 may include determining, based on the Brillouin trace, a Brillouin frequency shift and a Brillouin power for the DUT to implement an absolute referencing of a Rayleigh reference trace.

At block 212, the method 200 may include determining, relative to the Rayleigh reference trace, a further Brillouin frequency shift and a Rayleigh frequency shift.

At block 214, the method 200 may include determining, based on the further Brillouin frequency shift and the Rayleigh frequency shift, a temperature or a strain associated with the DUT.

Referring to FIGS. 1 and 3, and particularly FIG. 3, at block 302, the method 300 may include maintaining a constant optical frequency for a first laser beam and a second laser beam.

At block 304, the method 300 may include modulating the first laser beam. The modulated first laser beam may be injected into a DUT.

At block 306, the method 300 may include acquiring a backscattered signal from the DUT. The backscattered signal results from the modulated first laser beam injected into the DUT, and the second laser beam may be used as a local oscillator.

At block 308, the method 300 may include determining, based on the acquired backscattered signal from the DUT, a Rayleigh trace for the DUT.

At block 310, the method 300 may include maintaining a predetermined offset frequency shift between the first laser beam and the second laser beam. The predetermined offset frequency shift is relative to a predetermined frequency of either the first laser beam or the second laser beam.

At block 312, the method 300 may include modulating the first laser beam that includes the predetermined offset frequency shift. The modulated first laser beam that includes the predetermined offset frequency shift may be injected into the DUT.

At block 314, the method 300 may include acquiring a further backscattered signal from the DUT. The further backscattered signal results from the modulated first laser beam that includes the predetermined offset frequency shift injected into the DUT, and the second laser beam may be used as the local oscillator.

At block 316, the method 300 may include determining, based on the acquired further backscattered signal from the DUT, a Brillouin trace for the DUT.

At block 318, the method 300 may include determining, based on the Brillouin trace, a Brillouin frequency shift and a Brillouin power for the DUT to implement an absolute referencing of a Rayleigh reference trace.

At block 320, the method 300 may include determining, relative to the Rayleigh reference trace, a further Brillouin frequency shift and a Rayleigh frequency shift. The Rayleigh frequency shift may be determined based on the Rayleigh trace for the DUT.

At block 322, the method 300 may include determining, based on the further Brillouin frequency shift and the Rayleigh frequency shift, a temperature or a strain associated with the DUT.

Figure 4:
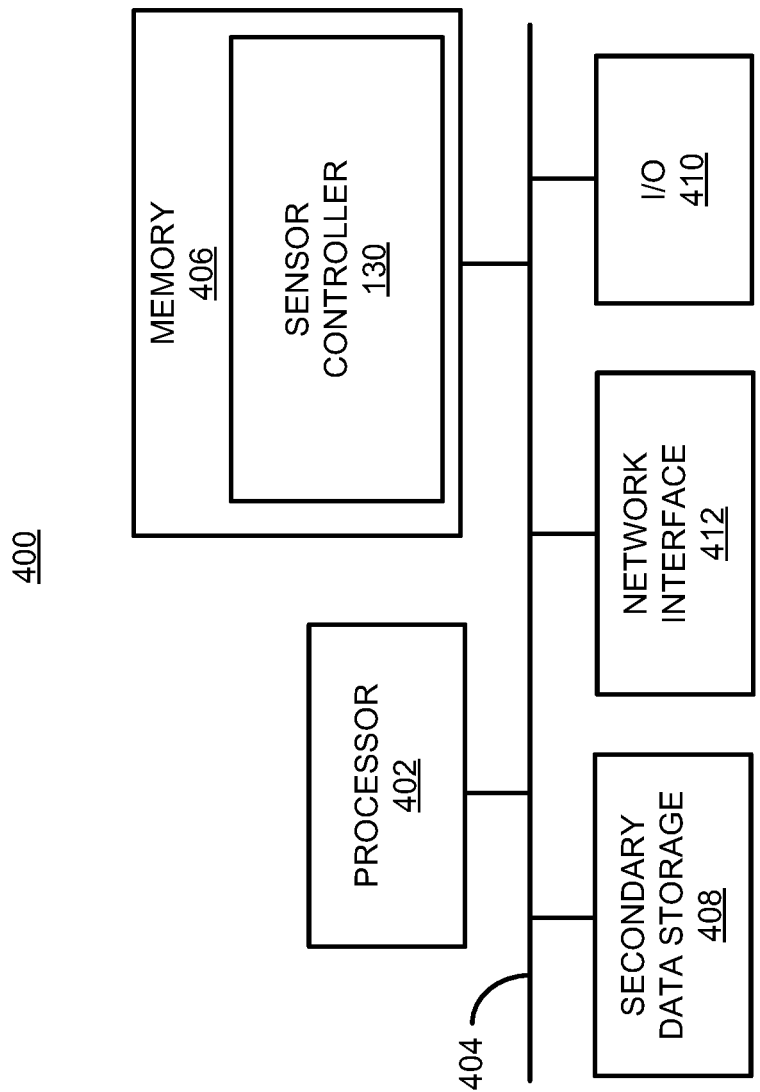
FIG. 4 illustrates a computer system, according to an example of the present disclosure.

FIG. 4 shows a computer system 400 that may be used with the examples described herein. The computer system may represent a platform that includes components that may be in a server or another computer system. The computer system 400 may be used as part of a platform for the sensor controller 130. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include the sensor controller 130 including machine readable instructions residing in the memory 406 during runtime and executed by the processor 402.

The computer system 400 may include an I/O device 410, such as a keyboard, a mouse, a display, etc. The computer system may include a network interface 412 for connecting to a network. Other known electronic components may be added or substituted in the computer system.

The processor 402 may be designated as a hardware processor. The processor 402 may execute operations associated with various components of the temperature or strain distribution sensor 100. For example, the processor 402 may execute operations associated with the sensor controller 130, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A temperature or strain distribution sensor comprising:
    a first laser source to emit a first laser beam;
    a second laser source to emit a second laser beam;
    a photodiode to acquire a beat frequency between the first laser beam and the second laser beam, wherein the beat frequency is used to maintain
        a predetermined offset frequency shift between the first laser beam and the second laser beam, wherein the predetermined offset frequency shift is relative to a predetermined frequency of either the first laser beam or the second laser beam, or
        a constant optical frequency for the first laser beam and the second laser beam;
    a modulator to modulate the first laser beam, wherein the modulated first laser beam is to be injected into a device under test (DUT); and
    a coherent receiver to acquire a backscattered signal from the DUT, wherein the backscattered signal results from the modulated first laser beam injected into the DUT, and wherein
        the coherent receiver is to use the modulated first laser beam injected into the DUT and the second laser beam to determine a temperature or a strain associated with the DUT.

2. The temperature or strain distribution sensor of claim 1, wherein the predetermined offset frequency shift is approximately 10.8 GHz.

3. The temperature or strain distribution sensor of claim 1, wherein the predetermined offset frequency shift is selected from a range of approximately 10.0 GHz to approximately 13.0 GHz.

4. The temperature or strain distribution sensor of claim 1, wherein
    the coherent receiver is to use the modulated first laser beam injected into the DUT and the second laser beam as a local oscillator to determine a Rayleigh trace with respect to the DUT based on the constant optical frequency for the first laser beam and the second laser beam, wherein the Rayleigh trace is used to determine a Rayleigh frequency shift for the DUT to determine the temperature or the strain associated with the DUT.

5. The temperature or strain distribution sensor of claim 1, wherein the DUT is an optical fiber.

6. The temperature or strain distribution sensor of claim 1, further comprising:
    a polarization beam splitter (PBS) of the coherent receiver to
        receive the backscattered signal, and
        divide the backscattered signal into two different polarization states, wherein
            a divided portion of the backscattered signal corresponding to a first polar state is to be mixed with the second laser beam at the first polar state, and
            a divided portion of the backscattered signal corresponding to a second polar state is to be mixed with the second laser beam at the second polar state to determine a Brillouin trace with respect to the DUT.

7. A method for temperature or strain determination, the method comprising:
    maintaining a predetermined offset frequency shift between a first laser beam and a second laser beam, wherein the predetermined offset frequency shift is relative to a predetermined frequency of either the first laser beam or the second laser beam;
    modulating the first laser beam, wherein the modulated first laser beam is to be injected into a device under test (DUT);
    acquiring a backscattered signal from the DUT, wherein the backscattered signal results from the modulated first laser beam injected into the DUT; and
    determining, based on the acquired backscattered signal from the DUT and the second laser beam, a temperature or a strain associated with the DUT.

8. The method for temperature or strain determination according to claim 7, further comprising:
    maintaining a constant optical frequency for the first laser beam and the second laser beam;
    determining, based on the constant optical frequency for the first laser beam and the second laser beam, a Rayleigh trace with respect to the DUT; and
    determining, based on the Rayleigh trace with respect to the DUT, the Rayleigh frequency shift for the DUT.

9. The method for temperature or strain determination according to claim 7, further comprising:
    repeating the acquisition of the backscattered signal from the DUT for a plurality of frequency shifts;
    sampling, based on the repeated acquisitions corresponding to the plurality of frequency shifts and the acquisition of the backscattered signal from the DUT, a distributed Brillouin spectra; and
    determining, based on the sampling of the distributed Brillouin spectra, a Brillouin frequency shift along the DUT to implement an absolute referencing of a Rayleigh reference trace.

10. The method for temperature or strain determination according to claim 9, further comprising:
    determining, based on the sampling of the distributed Brillouin spectra, Brillouin power by performing an integration operation with respect to the Brillouin frequency shift along the DUT to implement the absolute referencing of the Rayleigh reference trace.

11. The method for temperature or strain determination according to claim 7, wherein the DUT is an optical fiber.

12. The method for temperature or strain determination according to claim 7, wherein the predetermined offset frequency shift is approximately 10.8 GHz.

13. The method for temperature or strain determination according to claim 7, wherein the predetermined offset frequency shift is selected from a range of approximately 10.0 GHz to approximately 13.0 GHz.

14. A method for temperature or strain determination, the method comprising:
    maintaining a constant optical frequency for a first laser beam and a second laser beam;
    modulating the first laser beam, wherein the modulated first laser beam is to be injected into a device under test (DUT);
    acquiring a backscattered signal from the DUT, wherein the backscattered signal results from the modulated first laser beam injected into the DUT;

determining, based on the acquired backscattered signal from the DUT, a Rayleigh trace for the DUT;

maintaining a predetermined offset frequency shift between the first laser beam and the second laser beam, wherein the predetermined offset frequency shift is relative to a predetermined frequency of either the first laser beam or the second laser beam;

modulating the first laser beam that includes the predetermined offset frequency shift, wherein the modulated first laser beam that includes the predetermined offset frequency shift is to be injected into the DUT;

acquiring a further backscattered signal from the DUT, wherein the further backscattered signal results from the modulated first laser beam that includes the predetermined offset frequency shift injected into the DUT; and determining, based on the acquired further backscattered signal from the DUT and the second laser beam, a temperature or a strain associated with the DUT.

15. The method for temperature or strain determination according to claim 14, further comprising:

repeating the acquisition of the further backscattered signal from the DUT for the predetermined offset frequency shift; and averaging, during scanning of the first laser beam and the second laser beam over a wavelength range with the predetermined offset frequency shift between the two laser beams, the repeated acquisitions of the further backscattered signal from the DUT for the predetermined offset frequency shift to reduce coherent fading noises.

16. The method for temperature or strain determination according to claim 14, wherein the DUT is an optical fiber.

17. The method for temperature or strain determination according to claim 14, wherein the predetermined offset frequency shift is approximately 10.8 GHz.

18. The method for temperature or strain determination according to claim 14, wherein the predetermined offset frequency shift is selected from a range of approximately 10.0 GHz to approximately 13.0 GHz.

19. The method for temperature or strain determination according to claim 14, further comprising:

determining, based on sampling of a distributed Brillouin spectra, a Brillouin power by performing an integration operation with respect to a Brillouin frequency shift for the DUT to implement an absolute referencing of a Rayleigh reference trace.

20. The method for temperature or strain determination according to claim 14, further comprising:

repeating the acquisition of the further backscattered signal from the DUT for a plurality of frequency shifts;

sampling, based on the repeated acquisitions corresponding to the plurality of frequency shifts and the acquisition of the further backscattered signal from the DUT, a distributed Brillouin spectra; and determining, based on the sampling of the distributed Brillouin spectra, a Brillouin frequency shift to implement an absolute referencing of a Rayleigh reference trace.

* * * * *